March 11, 1930.  H. J. READ  1,749,959
AIRPLANE
Filed July 28, 1928    2 Sheets-Sheet 1
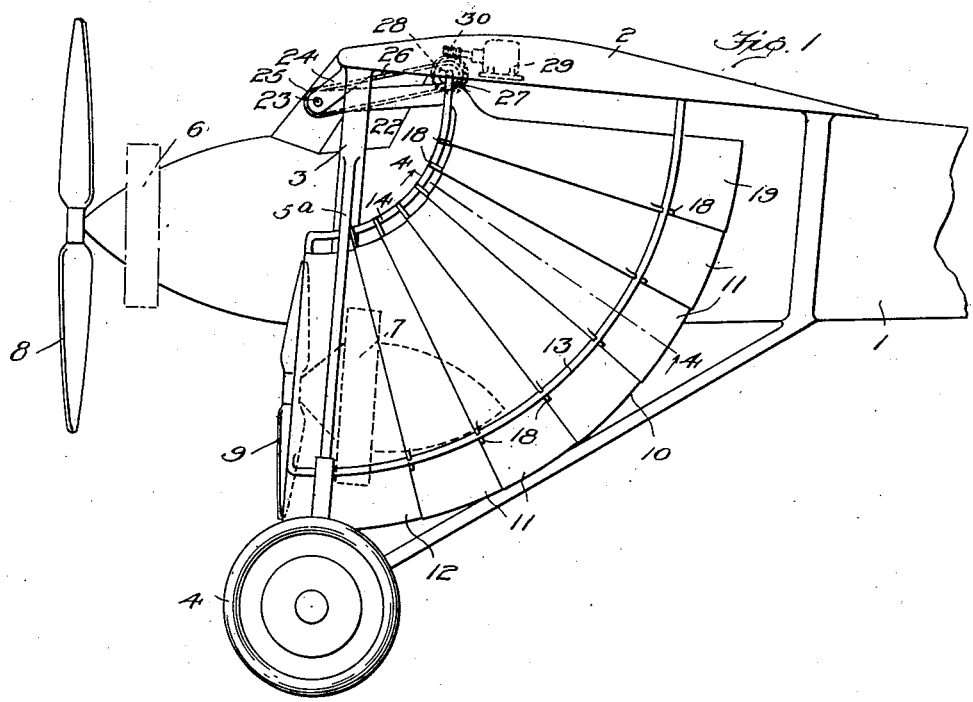
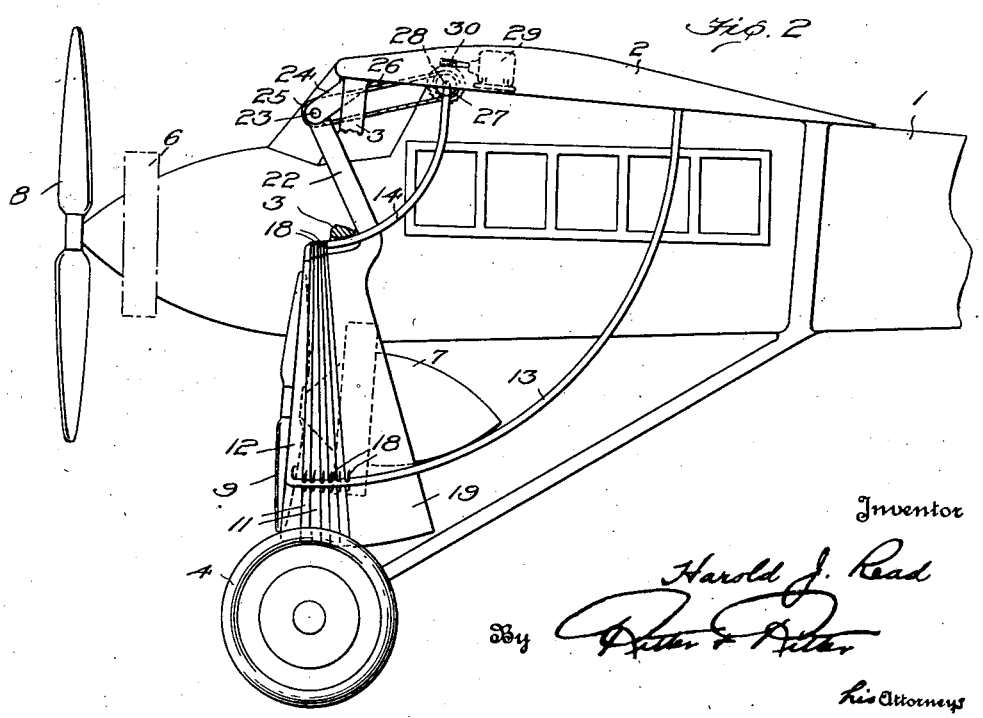
Inventor
Harold J. Read
By Dexter & Dexter
his Attorneys March 11, 1930. H. J. READ 1,749,959
AIRPLANE
Filed July 28, 1928 2 Sheets-Sheet 2

Inventor
Harold J. Read
By Ritter & Ritter
his Attorneys

Patented Mar. 11, 1930

1,749,959

UNITED STATES PATENT OFFICE

HAROLD J. READ, OF SAN DIEGO, CALIFORNIA

AIRPLANE

Application filed July 28, 1928. Serial No. 295,900.

My invention relates to airplanes and more particularly to means whereby vertical ascent and descent of a plane can be controlled with ease and at will.

As is well known lift is the primary requirement of an airplane and the principal factor controlling the lift of any given plane is the angle at which air strikes the wings thereof. The optimum angle of incidence at which air strikes the wings of a plane in ordinary flight is 15° and even at this angle the plane can lift but approximately six-thirteenths of its weight as compared with the same force exerted upon the wings at an angle of 90°. Due to the inclination of its wings there is a suctional or negative lift on the upper surface when the plane is in flight. The force exerted by this negative lift is comparatively large, some authorities attributing to this factor three-fifths of the total lift, the remaining two-fifths being due to impact of air on the under surface of the wings. Should the wings be streamlined this negative lift is practically eliminated. It is, of course, appreciated that this lift on the upper surface of the wing only occurs after a given velocity in the air has been obtained. Therefore in the take off of the airplane when the maximum lift is required the velocity of the plane is not sufficient to create this negative lift. Thus the initial lift is entirely accomplished by the impact of the air on the under surface of the wing. It follows then that the upper-surface-lift is not available when the greatest need for it exists and after that it becomes a detrimental factor, functioning as a drag.

Due to all of the above circumstances an excessive amount of power is consumed in order to obtain sufficient velocity to negotiate a lift. When the propeller of the airplane is rotating and the plane is kept from moving the propeller acts as an air blower driving a cylindrical column of air to the rear at a rate equivalent to the propeller pitch minus its slip considered as a blower, not as a propeller. The air thus leaving the propeller is variously termed but for purposes of this specification it will be called the "slip-stream". When the airplane is stationary and the propeller is rotating the velocity of its slip-stream is a maximum and it decreases as the velocity of the airplane increases, that is, should the velocity of the slip-stream be 100 miles per hour when the plane is stationary it will decrease to 80 miles per hour when the plane attains a velocity of 20 miles per hour. Thus it will be seen that the force of the slip-stream is greatest when the lift required is a maximum and it is the object of this invention to provide efficient, simple and rugged means for utilizing the slip-stream of one or more of the propellers of an airplane to create a lift to assist vertical ascent or descent of the plane.

A primary feature of the invention consists in associating with a propeller of an airplane means which is movable into and out of the path of the propeller slip-stream for deflecting it upwardly against the underside of a wing of a plane.

Another feature of the invention consists in mounting a substantially right angle elbow at the rear of a propeller of an airplane for deflecting the slip-stream upwardly against the underside of a wing of the plane, the elbow comprising a plurality of telescoping sections.

Other and more specific features of the invention residing in advantageous forms and combinations and relations of parts will hereinafter appear and be pointed out in the claims.

In the drawings illustrating a preferred embodiment of the invention,

Figure 1 is a fragmentary side elevational view of an airplane showing the invention applied thereto and in operative position.

Figure 2 is a side elevational view similar to Figure 1 showing the device in inoperative position.

Figure 3:
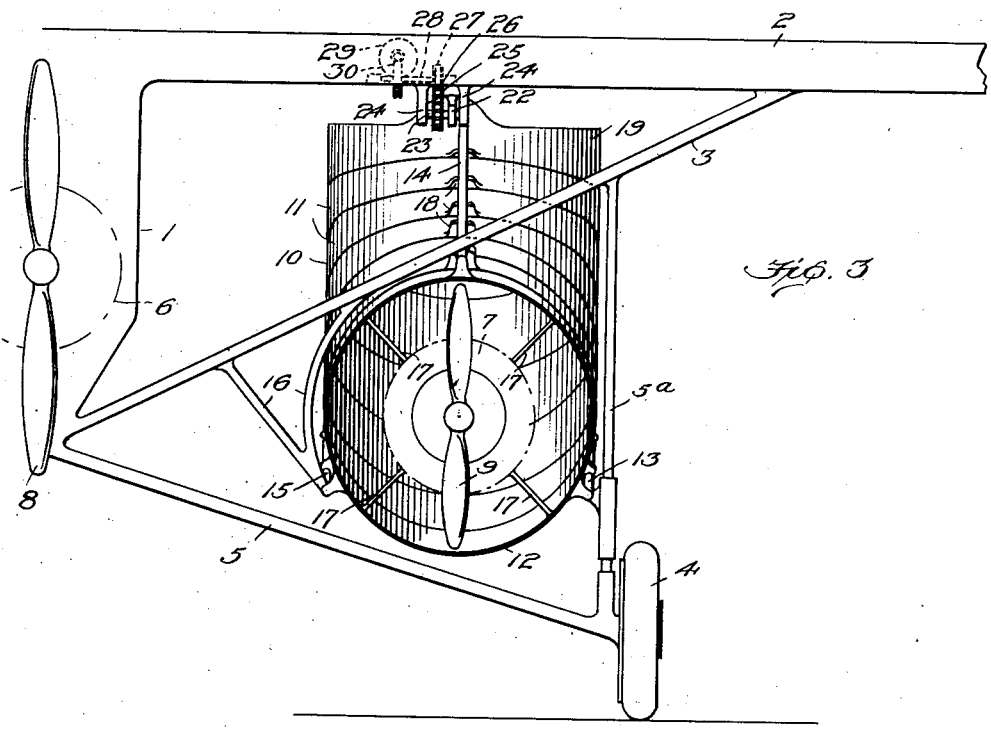
Figure 3 is a fragmentary front elevational view of the airplane, the device being shown in operative position.
Figures 4, 5:
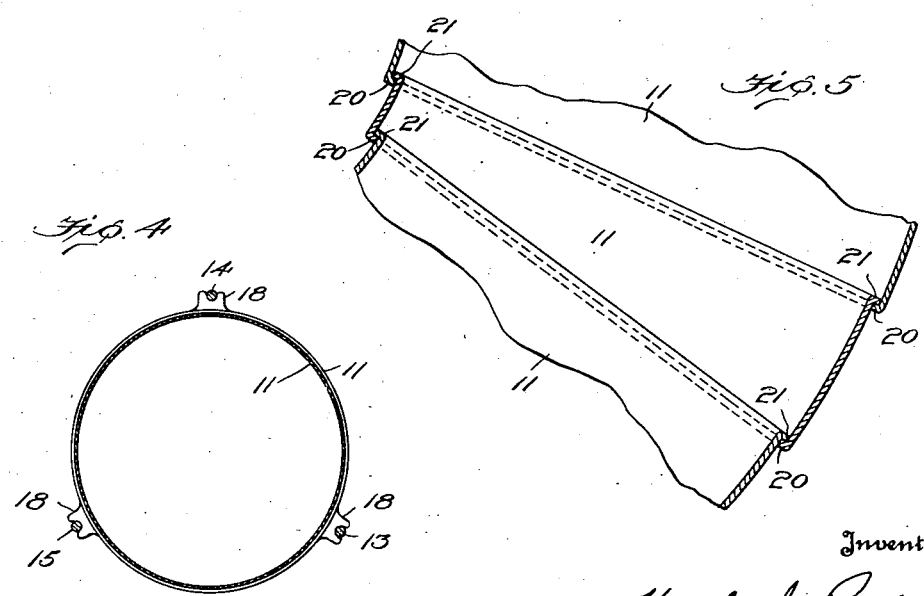
Figure 4 is a sectional view taken on line 4—4 Figure 1.
Figure 5 is a longitudinal fragmentary enlarged sectional view of the telescoping elbow.

Since the construction of the airplane is identical on each side of its longitudinal axis only one side of the plane is illustrated.

While my invention is applicable to substantially any type of airplane, for purposes of illustration it is shown as applied to a trimotored monoplane of the cabin type having a main body 1 and a wing 2 connected by a plurality of the usual struts 3. The airplane is provided with the usual wheels 4 which are suitably connected to the plane by landing gear struts 5, vertical members 5ª being operatively connected to the latter at their ends for rigidifying them.

As stated above the plane is of the trimotored type having a nose motor, diagrammatically shown at 6, and auxiliary motors, diagrammatically shown at 7, disposed on opposite sides of the latter. All of the motors are preferably of the radial type and the horsepower of the nose motor 6 is desirably equal to the combined horsepower of the motors 7. The motors 6 and 7 are of course each provided with propellers designated respectively by the reference numerals 8 and 9.

The means devised for utilizing the otherwise waste force of the slip-stream of the propeller consists of an elbow 10 formed of a plurality of movable sections 11. Since greatest efficiency is obtained when a force acts upon an object in a direction normal to the surface acted upon, each of the telescoping sections 11 is so arranged and proportioned that when in operative position they will deflect the slip-stream to cause it to impinge at substantially a right angle against the underside of the wing 2. As the slip-stream is substantially in the form of a cylindrical column the diameter of the conduit formed by the telescoping sections 11, is of substantially the same size as the diameter of the circle described by the ends of the propeller. It should be noted that the resistance offered by a true elbow having a 90° or less bend is so small as to be negligible.

Any suitable or convenient means may be employed for properly positioning the elbow 10. In the present embodiment of the invention each of the movable sections 11 is adapted to telescope over an immovable member 12, the diameter of the latter being slightly less than that of the adjoining movable section. This member 12 which in fact constitutes a part of the elbow 10 is rigidly secured to the airplane by curved guide rods or arms 13, 14 and 15 respectively; the outer end of the guide 13 being connected to the vertical strut 5ª, the outer end of the guide 14 to the diagonal strut and outer end of the guide 15 to an auxiliary frame 16, the latter also being connected to the diagonal strut. The inner end of each of the guide rods is suitably secured in the wing 2. The auxiliary motor 7 is mounted concentrically in the immovable member 12 of the elbow by a plurality of arms 17.

Each of the movable sections 11 of the elbow might advantageously be provided with a plurality of lugs or projections 18 which overlappingly engage opposite sides of the respective guide rods for properly supporting and guiding them when being actuated. Each of the movable sections with the exception of the top one 19, is also fashioned with inturned and outturned flanges 20 and 21, respectively, the inturned flange of each section being cooperable with the outturned flange of the next adjacent section. The top section is merely fashioned with an inturned flange which cooperates with the outturned flange of its neighboring section and it will thus be seen that when the top section is moved the other sections are successively set into motion, being brought to rest when the top section has reached its limit of travel. As clearly shown in Figure 1 of the drawings the upper edge of the top section 19, when the elbow is in operative position, is spaced a sufficient distance from the underside of the wing 2 so that air may readily escape from the elbow.

The upper section is fashioned with a laterally projecting arm 22 which is keyed or otherwise suitably secured to a rotatable shaft 23, the latter being journaled in a pair of arms 24 depending downwardly from the wing 2 adjacent its outer end. Also secured to the shaft 23 is a sprocket or gear wheel 25 adapted to receive and be actuated by an endless chain 26. This chain also passes around a gear wheel mounted upon a shaft 28 which is operated by a motor 29 through the intermediacy of suitable gearing designated by the numeral 30. Thus upon operation of the motor 29 the upper movable section 19 is rotated causing the sections 11 to move into or out of operative position depending upon the will of the operator.

From the foregoing it will be appreciated that when a vertical lift is desired to cause the plane to ascend the telescoping sections are respectively moved into the position shown in Figures 1 and 3 of the drawings to form the elbow 10 the latter thus serving to deflect the slip-stream of the propellers 9 upwardly against the underside of the wing 2 causing it to strike thereagainst at a substantially right angle. When the plane has reached the desired height the motor 29 is operated so as to cause the sections 11 and 19 to telescope one on the other over the cylindrical member 12 as clearly shown in Figure 2. In this position the device is entirely inoperative permitting a free and unobstructed flow of the slip-stream. It will be observed that when the device is in inoperative position it offers a minimum head resistance of approximately only one square foot. When the plane is in flight the sections 11 and 19 may be moved into operative position by proper manipulation of the motor 29 thus deflecting the air against the underside of the wing 2 to cause a braking effect and at the same time a lift. The net result of this would of course cause a gradual descent of the plane. Should further control be required to make a "soft" landing the rotation of the propeller of the auxiliary motors would be accelerated to produce a slip-stream of greater velocity to effect the desired landing.

From the foregoing it will be perceived that although my device is of simple design and easily operable it will efficiently perform its intended and desired functions.

I claim:

1. An airplane having a plurality of propellers, the axes of rotation of which are normally substantially horizontal and means movable into and out of the path of the slip-stream of one of said propellers to deflect it upwardly against the underside of a wing of the airplane.

2. An airplane having a plurality of propellers, the axes of rotation of which are normally substantially horizontal, and telescoping means at the rear of one of said propellers for deflecting its slip-stream upwardly against the underside of a wing of the airplane.

3. An airplane having a plurality of propellers, the axes of rotation of which are normally substantially horizontal, and means for deflecting the slip-stream of one of the propellers upwardly against the underside of a wing of the plane, said means being movable to inoperative position out of the path of the propeller slip-stream to permit its unobstructed flow.

4. An airplane having a plurality of propellers, the axes of rotation of which are normally substantially horizontal, and a collapsible conduit at the rear of one of said propellers for deflecting its slip-stream upwardly against the underside of a wing of the airplane, the diameter of said conduit being substantially as large as the diameter of the circle described by the ends of the propeller.

5. An airplane having a plurality of propellers, the axes of rotation of which are normally substantially horizontal, and means for deflecting the slip-stream of one of said propellers to cause it to impinge at a substantially right angle against the underside of a wing of the airplane, said means being movable into and out of the path of said slip-stream.

6. An airplane having a plurality of propellers, the axes of rotation of which are substantially horizontal, and a substantially right angle elbow at the rear of one of said propellers for deflecting its slip-stream upwardly against the underside of a wing of the airplane.

7. An airplane having a plurality of propellers, and an elbow of substantially uniform diameter throughout at the rear of one of said propellers for deflecting its slip-stream to cause it to impinge at a substantially right angle against the underside of a wing of the plane, the diameter of the elbow and that of the circle described by the ends of the propeller being substantially the same.

8. An airplane having a plurality of propellers, and a substantially right angle elbow at the rear of one of said propellers for deflecting its slip-stream upwardly against the underside of a wing of the airplane, said elbow involving a plurality of telescoping sections.

9. An airplane having a plurality of propellers, the axes of rotation of which are normally substantially horizontal, an elbow involving a plurality of telescoping sections at the rear of one of said propellers for deflecting its slip-stream upwardly against the underside of a wing of the airplane, and means for moving said sections into and out of operative position, said sections when in inoperative position permitting unobstructed flow of the propeller slip-stream.

10. An airplane having a plurality of propellers, the axes of rotation of which are normally substantially horizontal, an elbow involving a plurality of telescoping sections at the rear of one of said propellers for deflecting its slip-stream upwardly against the underside of a wing of the airplane, and a motor carried by the said wing for operating said sections.

11. An airplane having a plurality of propellers, the axes of rotation of which are normally substantially horizontal, an elbow involving a plurality of telescoping sections for deflecting the slip-stream of one of said propellers upwardly against the underside of a wing of the airplane, one of said sections being pivotally mounted, and means for actuating said pivoted section, each of said sections being connected so as to be successively moved upon operation of said pivoted section.

12. An airplane having a plurality of propellers, the axes of rotation of which are normally substantially horizontal, and an elbow involving a plurality of movable sections for deflecting the slip-stream of one of said propellers upwardly against the underside of a wing of the airplane, the upper section of said elbow when in operative position being spaced from the underside of the wing to permit air to escape from the elbow.

13. An airplane involving a propeller whose axis of rotation is normally substantially horizontal, and means movable into and out of the path of the slip-stream of said propeller for deflecting said slip-stream upwardly against the under side of a wing of the airplane.

14. An airplane embodying a propeller and means movable into and out of the path of the slip-stream of said propeller for deflecting said slip-stream upwardly against the under side of a wing of the airplane.

15. An airplane embodying a propeller, and a cylindrical elbow movable into and out of the path of the slip-stream of said propeller for deflecting said slip-stream upwardly against the under side of a wing of the airplane.

16. An airplane embodying a propeller, and a substantially cylindrical elbow for deflecting the slip-stream of said propeller upwardly against the under side of a wing of the airplane, said cylindrical elbow comprising a plurality of telescoping sections movable into and out of the path of said slip-stream.

In testimony whereof I affix my signature.

HAROLD J. READ.